United States Patent [19]
Nagata et al.

[11] Patent Number: 6,066,226
[45] Date of Patent: *May 23, 2000

[54] METHOD OF MAKING A SHEET-SHAPED OXYGEN ABSORBER

[75] Inventors: Masaki Nagata; Futoshi Nakaya; Hideyuki Takahashi; Yuichi Fujii, all of Tokyo, Japan

[73] Assignee: Mitsubishi Gas Chemical Company, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/510,412

[22] Filed: Aug. 2, 1995

[30] Foreign Application Priority Data

Aug. 3, 1994 [JP] Japan ..................... 6-182412

[51] Int. Cl.⁷ .............. B32B 31/18; B32B 31/20
[52] U.S. Cl. ............. 156/251; 156/275.1; 428/35.2; 428/35.4; 428/480; 428/516; 206/484.1
[58] Field of Search ............. 428/500, 507, 428/511, 512, 513, 515, 35.2, 35.4, 483, 516, 480; 156/275.1, 251; 206/204, 484.1

[56] References Cited

U.S. PATENT DOCUMENTS 5,116,660   5/1992   Komatsu et al. ............ 428/192

FOREIGN PATENT DOCUMENTS

| 0366254 | 5/1990 | European Pat. Off. . |
|---|---|---|
| 55-44344 | 3/1980 | Japan . |
| 56-26524 | 3/1981 | Japan . |
| 272851 | 3/1990 | Japan . |
| 286758 | 3/1990 | Japan . |
| 2020605 | 11/1979 | United Kingdom . |
| 9212004 | 7/1992 | WIPO . |

*Primary Examiner*—Rena L. Dye
*Attorney, Agent, or Firm*—Leydig, Voit & Mayer, Ltd.

[57] ABSTRACT

A method of making a sheet-shaped oxygen absorber includes preparing an oxygen-absorbing resin sheet having opposed first and second surfaces and including an oxygen-absorbing composition in a thermoplastic resin; applying first and second covering members to and in contact with the first and second surfaces, respectively, of the oxygen-absorbing resin sheet to form a laminated structure, at least one of the covering members being air-permeable; and ultrasonically heat sealing the first covering member to the second covering member along the periphery of a closed planar geometric figure, encapsulating at least a part of the oxygen-absorbing resin sheet and cutting the first and second covering members where the first and second covering members are sealed to each other, along the periphery of the closed planar geometric figure, to produce the sheet-shaped oxygen absorber.

12 Claims, 3 Drawing Sheets

METHOD OF MAKING A SHEET-SHAPED OXYGEN ABSORBER

BACKGROUND OF THE INVENTION

1. Field of the Invention

The present invention relates to a sheet-shaped oxygen absorber and a method for manufacturing such sheet-shaped oxygen absorber. More particularly, the present invention relates to a sheet-shaped oxygen absorber which is made by laminating plastic films or covering members in a sheet form over an oxygen-absorbing resin sheet, and which is cut into a desirable shape by ultrasonic heat sealing.

2. Description of the Prior Art

The technology for preventing a substance to be preserved, such as food and medicine, from suffering, from for example, oxidation, deterioration, discoloration, generation of molds, propagation of aerobic bacterium, and vermin damages, has consisted of the method of placing the substance to be preserved, together with an oxygen absorber, in a package which is resistant to gas permeation.

Oxygen absorbers currently on the market are normally of the type consisting of an air-permeable small bag containing a granular oxygen absorber, the so-called "small-bag-shaped oxygen absorber." However, if the small-bag-shaped oxygen absorber is placed in a package together with a substance to be preserved, the oxygen absorber will become mixed with the preserved substance. If the small-bag-shaped oxygen absorber is mixed with the preserved substance, there is a possibility that the small-bag-shaped oxygen absorber may be mistakenly cooked with the preserved substance. Moreover, when placing the small-bag-shaped oxygen absorber together with food in a gas-permeation-resistant package such as a bag, since the thickness of the small-bag-shaped oxygen absorber is not uniform, the surfaces of the package may become uneven and other problems in the wrapping or appearance of the product sometimes occur. Furthermore, if the small bag is broken by mishandling, it is possible that an oxygen-absorbing composition leaking out of the small bag may mix with the preserved substance.

On the other hand, as another form of an oxygen absorber which is different from the above-described small-bag-shaped oxygen absorber, various types of sheet-shaped oxygen absorbers have been suggested, which are made by dispersing an oxygen-absorbing composition in a thermoplastic resin and forming it into a sheet shape. For example, the official gazette of the Japanese Patent Laid-Open (Kokai) Publication No. SHO 55-44344 discloses a sheet-shaped oxygen absorber which is made by blending an oxygen-absorbing composition in a thermoplastic resin and forming the obtained mixture into a sheet shape. The official gazette of the Japanese Patent Laid-Open (Kokai) Publication No. SHO 56-26524 suggests a sheet-shaped oxygen absorber which is made by mixing an oxygen-absorbing composition in an expandable resin layer, forming the obtained mixture in a sheet form, and then making the expandable resin expand or bubble. However, each of the sheet-shaped oxygen absorbers described in the above-mentioned official gazettes is covered with air-permeable covering members on its top and bottom surfaces, but no treatment is given to the remaining portions (hereinafter referred to as the "periphery") of the oxygen absorber. Accordingly, since the periphery of these conventional sheet-shaped oxygen absorbers is exposed, there are problems such as leakage of the oxygen-absorbing composition or contamination of food due to contact with the oxygen-absorbing composition.

The applicant of this invention also discloses a film-shaped oxygen absorber in the official gazette of the Japanese Patent Laid-Open (Kokai) Publication No. HEI 2-72851 and a sheet-shaped oxygen absorber in the official gazette of the Japanese Patent Laid-Open (Kokai) Publication No. HEI 2-86758. These official gazettes respectively disclose a sheet-shaped oxygen absorber in which all surfaces are covered or wrapped, and which is made by laminating covering members, larger than the oxygen-absorbing sheet, on both surfaces of the oxygen-absorbing sheet which comprises an oxygen-absorbing composition contained in a thermoplastic resin, and by sealing the overlapped covering members along the periphery by heat so that the resin containing the oxygen-absorbing composition will not be exposed at the periphery.

However, in order to obtain the above-described sheet-shaped oxygen absorber which is entirely covered or wrapped, it is necessary in the manufacturing process to cut the oxygen absorber and the covering members respectively in different sizes and in desirable shapes and to laminate and seal them together. In this case, there is the problem that the shape of the oxygen absorber cannot be freely selected and there is another problem in productivity. Moreover, since the covering members are required to have a larger area, there is also a cost problem.

In the aforementioned official gazette of the Japanese Patent Laid-Open (Kokai) Publication No. HEI 2-86758, it is described that the periphery of the sheet-shaped oxygen absorber can be covered by melting and cutting the laminated sheet made of the oxygen absorber sheet and the covering members. However, although a normal heat melting and cutting method realizes less leakage of the oxygen-absorbing composition compared to the completely exposed periphery of the oxygen absorber resin sheet which is cut by a normal cutting method, it is difficult to completely cover the periphery and the leakage problem still exists. Moreover, in the normal heat melting and cutting method, heat is applied from the outside of the film, resulting in the problem of flashes remaining at the sectioned faces. Accordingly, the heat melting and cutting method has not always been satisfactory.

SUMMARY OF THE INVENTION

The present invention aims to solve the above-described problems. An objective of the invention is to provide a sheet-shaped oxygen absorber in which all of its surfaces can be completely covered, and which is safe since the oxygen absorber does not contact food or leak, has superior productivity and can be freely produced in various shapes, and to provide a method for manufacturing such sheet-shaped oxygen absorber.

Through a more extensive study, the Applicant resolved the conventional problems by laminating covering members, which respectively comprise heat-sealable resin layers which can be fused and sealed together by heat, on an oxygen-absorbing resin sheet, and by cutting the laminated sheet by an ultrasonic heat sealing and cutting method.

In other words, the present invention provides a sheet-shaped oxygen absorber consisting of a multi-layer structural body which comprises: an oxygen-absorbing resin sheet in which an oxygen-absorbing composition is dispersed in a thermoplastic resin; a first covering member placed over one surface of the oxygen-absorbing resin sheet; and a second covering member placed over the other surface of the oxygen-absorbing resin sheet. In this sheet-shaped oxygen absorber, at least one or both of the first or second covering members are permeable to air, and the periphery of the multi-layer structural body is sealed by ultrasonic heat sealing.

The first covering member comprises at least a first heat-sealable resin layer and is placed over the oxygen-absorbing resin sheet so that the first heat-sealable resin layer directly contacts the oxygen-absorbing resin sheet. The second covering member comprises at least a second heat-sealable resin layer and is placed over the oxygen-absorbing resin sheet so that the second heat-sealable resin layer directly contacts the oxygen-absorbing resin sheet.

The present invention provides a sheet-shaped oxygen absorber in which its first and second heat-sealable resin layers are fused and sealed together along the periphery.

The present invention also provides a method for manufacturing a sheet-shaped oxygen absorber, comprising: the step of laminating an air-permeable covering member, which comprises a first heat-sealable resin layer at least on one surface, over one surface of an oxygen-absorbing resin sheet in which an oxygen-absorbing composition is dispersed in a thermoplastic resin in a manner such that the first heat-sealable resin layer directly contacts the oxygen-absorbing resin sheet; the step of laminating an air-permeable or air-permeation-resistant covering member, which comprises a second heat-sealable resin layer at least on one surface, over the other surface of the oxygen-absorbing resin sheet in a manner such that the second heat-sealable resin layer directly contacts the oxygen-absorbing resin sheet; and the step of cutting a multi-layer structural body into a desirable shape by an ultrasonic heat sealing and cutting method, the multi-layer structural body consisting of the air-permeable covering member, the oxygen-absorbing resin sheet, and the air-permeation-resistant covering member.

Since the sheet-shaped oxygen absorber of the present invention is cut into a desirable shape by the ultrasonic heat sealing and cutting method, the first and second heat-sealable resin layers are fused and sealed by heat at the cut portions, and the cut surfaces, that is, the periphery of the oxygen-absorbing resin sheet is covered. Therefore, not only the top and bottom surfaces of the oxygen-absorbing resin sheet, but also its periphery is not substantially exposed. Lack of substantial exposure of the periphery of the oxygen-absorbing resin sheet results in an oxygen absorber in which even if the periphery of the oxygen-absorbing resin sheet is not completely covered and a very small amount of residue of the oxygen-absorbing resin sheet remains, there are no problems in practical use such as leakage of the oxygen-absorbing composition from the periphery or mixing of the oxygen-absorbing composition to the preserved substance due to contact with the oxygen-absorbing resin sheet.

Exposure of the periphery of the oxygen-absorbing resin sheet is substantially eliminated by utilizing the ultrasonic heat sealing and cutting method because of the following reasons:

When the ultrasonic heat sealing and cutting method is performed, firstly the oxygen-absorbing resin sheet within the multi-layer structural body is heated, the thermoplastic resin then softens and simultaneously a cutting blade is pressed to the multi-layer structural body from outside, thereby the softened resin is moved away from the portions on which pressure is applied. Accordingly, at these pressure-applied portions, the first and second heat-sealable resin layers are fused and sealed by heat. Then the heat-sealed portions are cut by the cutting blade with pressure. As a result of the heat sealing of the first and second heat-sealable resin layers at the periphery (heat sealed portions) of the oxygen-absorbing resin sheet, the periphery of the oxygen-absorbing resin sheet is covered with the heat-sealable resin, in other words, the periphery of the oxygen-absorbing resin sheet becomes such that it has no substantial exposure.

In the sheet-shaped oxygen absorber of the present invention, it is desirable that the thermoplastic resin softens faster than both the heat-sealable resin layers. It is also desirable that the softening points of the heat-sealable resin layers are higher than the softening point of the thermoplastic resin. By using heat-sealable resin having such characteristics, exposure of the periphery of the oxygen-absorbing resin sheet can be prevented with more certainty.

Further, in the sheet-shaped oxygen absorber of the present invention, the total thickness of an air-permeable covering member, which comprises the first heat-sealable resin layer, and an air-permeable or air-permeation-resistant covering member, which comprises the second heat-sealable resin layer, can be made 10% or more of the thickness of the oxygen-absorbing resin sheet. By doing so, exposure of the periphery of the oxygen-absorbing resin sheet can be prevented with more certainty.

The oxygen-absorbing resin sheet itself has oxygen-absorbing capability and is made by dispersing the oxygen-absorbing composition in the thermoplastic resin and forming it into a sheet shape. As the oxygen-absorbing composition, a composition capable of exhibiting its oxygen-absorbing performance when dispersed in the thermoplastic resin is used. The type of oxygen-absorbing composition is not specifically limited as long as it can achieve the objective of the present invention. However, an oxygen-absorbing composition containing any one of iron powder, iron (I) chloride, ascorbic acid and salt thereof, or catechol as its main component can be used. Among them, a composition containing iron powder as its main component is preferably used.

As examples of the oxygen-absorbing resin sheet, a sheet obtained by mixing and kneading an iron-group oxygen absorber in polyolefin resin, and the same sheet further stretched to enhance its oxygen-absorbing performance (disclosed in the official gazette of the Japanese Patent Laid-Open (Kokai) Publication No. HEI 2-72851) can preferably be used.

The thickness of oxygen-absorbing resin sheet should preferably be 0.01–5 mm. An appropriate thickness should be selected within the above range in accordance with the nature or processability of the oxygen-absorbing composition.

The type of thermoplastic resin is not specifically limited as long as it is capable of exhibiting its oxygen-absorbing performance when the oxygen-absorbing composition is compounded. However, it is possible to select an appropriate resin from, for example, polyolefin-group resin, polymethylpentene-group resin, polyester-group resin, polyvinyl-alcohol-group resin, polyvinyl-chloride-group resin, polyvinylidene-chloride-group resin, or polyamide-group resin.

The first heat-sealable resin can be selected from, for example: polyolefin-group resin such as various kinds of polyethylene, ethylene-vinyl-acetate copolymer, polypropylene, propylene-ethylene copolymer, or propylene-α-olefin copolymer; polyester-group resin; polyvinylidene-chloride-group resin, or polyamide-group resin.

The air-permeable covering member comprising the first heat-sealable resin layer may utilize either a single layer or multiple layer construction. Examples of the air-permeable covering member are: nonwoven cloth of polyethylene-group resin; microporous membrane of polyethylene-group resin; laminated layers of the above-described nonwoven cloth and a porous film; or laminated layers of the above-described microporous membrane and a porous film. In the case of a simple layer, the air-permeable covering member itself is the first heat-sealable resin layer. Examples of the nonwoven cloth are "Tyvek" (made by Dupont Japan Inc.) and "LUXER" (made by ASAHI CHEMICAL INDUSTRY CO., LTD). Examples of the microporous film are "Duraguard" (made by Celanese Corp.), "NF sheet" (made by Tokuyama Soda Co., Ltd.), and "Nitto Flon" (by NITTO DENKO CORP).

As the air-permeable covering member, the first heat-sealable resin layer can be formed on one surface of a paper sheet, silicon rubber film, or trimethylpentene film.

If the covering member comprising the second heat-sealable resin layer is permeable to air, an air-permeable covering member similar to that mentioned above can be used, and the same air-permeable covering member as that comprising the first heat-sealable resin layer may be used.

If the covering member comprising the second heat-sealable resin layer is resistant to air permeation, a gas-permeation-resistant plastic film which is made from heat-sealable resin is used, which may consist of either a single layer or multiple layers. This gas-permeation-resistant covering member may be a gas-permeation-resistant film formed by coating thermoplastic resin over the oxygen-absorbing resin sheet or may be a gas-permeation-resistant film which is adhered by a hot melt adhesive layer.

The air-permeation covering member, which comprises the first heat-sealable resin layer, and the air-permeable or air-permeation-resistant covering member, which comprises the second heat-sealable resin layer, are placed so that their respective heat-sealable resin layers contact the oxygen-absorbing resin sheet. It is not always necessary to provide additional heat-sealable resin layers if the above heat-sealable resin layers are capable of achieving the objective of the present invention.

The thickness of the air-permeable covering member comprising the first heat-sealable resin layer and of the air-permeable or air-permeation-resistant covering member can be respectively selected within the range of 0.01–5 mm. However, it is desirable that the total thickness of these covering members should be no less than one tenth ($\frac{1}{10}$), more preferably no less than one eighth ($\frac{1}{8}$), of the thickness of the oxygen-absorbing resin sheet. If the thickness of each covering member becomes thinner than 0.01 mm, the covering members can hardly cover the cut periphery of the oxygen-absorbing resin sheet when the ultrasonic heat sealing and cutting is performed. As a result, the periphery of the oxygen-absorbing resin sheet is exposed, causing the oxygen-absorbing composition to leak out and to contaminate the preserved substance due to contact with the oxygen-absorbing resin sheet. On the other hand, if the thickness of each covering member exceeds 5 mm, the sheet-shaped oxygen absorber becomes too thick and there is a tendency of increased cost in materials.

The multi-layer structural body of the present invention may be constructed in a manner such that: the air-permeable covering member comprising the first heat-sealable resin layer and the air-permeable or air-permeation-resistant covering member comprising the second heat-sealable resin layer are simply laid respectively on the top and bottom surfaces of the oxygen-absorbing resin sheet in a manner such that the heat-sealable resin layers directly contact the oxygen-absorbing resin sheet; or the oxygen-absorbing resin sheet is previously adhered to either or both of the covering members by heat lamination or other methods. However, the oxygen-absorbing resin sheet which is not laid over and secured with the covering member(s) is more preferable for the purpose of ultrasonic heat sealing and cutting, because the periphery (heat sealed portions) of such oxygen-absorbing resin sheet can more easily be covered with the covering members and it is easier to produce the sheet-shaped oxygen absorber with no exposure of the periphery of the oxygen-absorbing resin sheet.

Each component member of the multi-layer structural body to be cut by ultrasonic heat sealing is mainly comprised of heat-sealable plastic. However, concerning the oxygen-absorbing resin sheet and both the covering members, materials other than plastic, such as paper, may be included as long as they can be cut by the ultrasonic heat sealing and cutting method.

According to the ultrasonic heat sealing and cutting method of the present invention, the multi-layer structural body is placed between an ultrasonic generating source which generates an ultrasonic wave and a jig placed at a position opposite to the ultrasonic generating source, and then the ultrasonic generating source generates an ultrasonic wave toward the multi-layer structural body and simultaneously the ultrasonic generating source and the jig hold the multi-layer structural body between them, thereby being capable of cutting the multi-layer structural body. It is desirable that a tip portion of at least either the ultrasonic wave source or the jig is formed in a blade shape. It is possible to select a desirable shape of the blade, such as a circle or polygon, corresponding to the shape of the sheet-shaped oxygen absorber to be cut out from the multi-layer structural body by ultrasonic heat sealing.

It is particularly preferable to set the angle (hereinafter referred to as the "blade angle") shown with the arrows of Numeral 10 in FIG. 6 of the blade of the ultrasonic generating source or the jig within the range of 5–175 degrees, or more preferably 15–160 degrees. If the blade angle is less than 5 degrees, the periphery of the cut oxygen-absorbing resin sheet cannot be sufficiently covered with the covering members and the oxygen-absorbing resin sheet will be exposed, causing leakage and other problems to easily occur. On the other hand, if the blade angle exceeds 175 degrees, vibrations caused by ultrasonic waves transmitted to portions other than those to be cut by ultrasonic heat sealing, and these vibrated portions are sealed by heat, thereby lowering the oxygen-absorbing performance of the oxygen-absorbing resin sheet and causing the shape of the oxygen absorber to become easily distorted.

The tip portion of the blade should be 0.01–3 mm wide, or more preferably 0.5–2 mm (as shown by arrows of Numeral 11 in FIG. 6) and should be substantially flat. If the tip portion of the blade is not flat, when the ultrasonic heat sealing and cutting is conducted, both the covering members will be pressed by the tip portion of the blade and then cut, leaving the first and second heat-sealable resin layers unsealed by heat. As a result, the periphery of the oxygen-absorbing resin sheet will be exposed and problems of contamination and leakage will occur. If the width of the flat tip portion of the blade exceeds 3 mm, flashes are formed at the cut surfaces, lowering the appearance of the oxygen absorber. Also, a larger output is required for the ultrasonic heat sealing and cutting. The blade of the above-mentioned width is not desirable because it takes more time to conduct the ultrasonic heat sealing and cutting and therefore productivity is lowered.

DETAILED DESCRIPTION OF THE PREFERRED EMBODIMENTS

Embodiments of the present invention are hereinafter explained with reference to the drawings.

EXAMPLE 1

Figure 1:
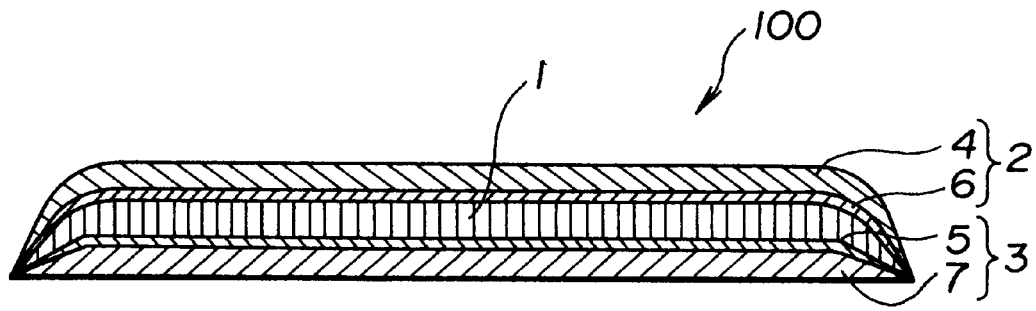
FIG. 1 is a sectional view of the sheet-shaped oxygen absorber of the present invention.

As shown in FIG. 1, the sheet-shaped oxygen absorber 100 of the present invention has a multi-layer construction in which the air-permeable covering member 2, consisting of the first heat-sealable resin layer 6 and a porous film 4, is placed over one surface of the oxygen-absorbing resin sheet 1 in which the oxygen-absorbing composition is dispersed in the thermoplastic resin in a manner such that the first heat-sealable resin layer 6 directly contacts the oxygen-absorbing resin sheet 1, while the air-permeation-resistant covering member 3, consisting of the second heat-sealable resin layer 5 and an air-permeation-resistant film 7, is placed over the other surface of the oxygen-absorbing resin sheet 1 in a manner such that the second heat-sealable resin layer 5 directly contacts the oxygen-absorbing resin sheet 1. At the periphery of the sheet-shaped oxygen absorber 100, the first heat-sealable resin layer 6 and the second heat-sealable resin layer 5 are fused and sealed by heat. Accordingly, the periphery of the oxygen-absorbing resin sheet 1 is covered with the first heat-sealable resin layer 6 and the second heat-sealable resin layer 5 and, therefore, the oxygen-absorbing resin sheet 1 is never exposed.

This sheet-shaped oxygen absorber 100 was manufactured in the following steps:

Iron powder (median diameter on a weight basis: 35 μm) was put in a vacuum mixing dryer with a heat jacket, and was heated and dried at a temperature of 130° C. under 10 mmHg of reduced pressure. At the same time, a mixed aqueous solution of calcium chloride, sodium chloride, and water, which was mixed in the proportion of calcium chloride:sodium chloride:water=0.5:0.5:2.5 (parts by weight), was sprayed to 100 parts by weight of the iron powder. Accordingly, the surface of the iron powder was coated with calcium chloride and sodium chloride, thereby obtaining an oxygen absorber composition.

100 parts of iron-group oxygen absorber (median diameter on a weight basis: 70 μm) described above and 100 parts of polyethylene resin were mixed together, and the obtained mixture was heated and melted at a temperature of 190° C. and then was formed into a sheet by using an extruder. This sheet was then stretched or oriented in a lengthwise direction to become four times longer at a temperature of 50° C. in order to obtain an oxygen-absorbing resin sheet 1 which is 0.5 mm thick and has high oxygen-absorbing performance.

Then, a porous film 4 (pore diameter: 0.8 mm; and percentage of porous area to the entire surface area: 7%), which is a perforated two-layer structural film made of oriented nylon (film thickness: 15 μm) and polyethylene (film thickness: 15 μm), and waterproof nonwoven cloth "LUXER" (made by ASAHI CHEMICAL INDUSTRY CO., LTD.) (film thickness: about 200 μm), which is the first heat-sealable resin layer 6, were laminated by heat, thereby producing the air-permeable covering member 2.

Moreover, ethylene-vinyl acetate copolymer (film thickness: 15 μm), which is the second heat-sealable resin layer 4, was placed on one side of an air-permeation-resistant film 7, which is made of polyethylene terephthalate (film thickness: 15 μm) and polyethylene (film thickness: 15 μm), thereby producing the air-permeation-resistant covering member 3.

The air-permeable covering member 2 was then laid over one surface of the oxygen-absorbing resin sheet 1 so that the first heat-sealable resin layer 6 of the air-permeable covering member 2 would directly contact the oxygen-absorbing resin sheet 1. The air-permeation-resistant covering member 3 was also laid over the other surface of the oxygen-absorbing resin sheet 1 so that the second heat-sealable resin layer 5 of the air-permeation-resistant covering member 3 would directly contact the oxygen-absorbing resin sheet 1. Accordingly, a multi-layer structural body was obtained.

This multi-layer structural body was then cut into a desirable shape by the ultrasonic heat sealing and cutting method by using an ultrasonic heat sealing and cutting device which has the construction described below. (The ultrasonic wave frequency was set at 10,000–70,000 Hz.)

As shown in FIGS. 2 through 6, the ultrasonic heat sealing and cutting device (output: 1.2 KW; and oscillation frequency: 20 KHz) is constructed in a manner such that it comprises: an ultrasonic vibration horn 8 on which the multi-layer structural body is set, and which generates an ultrasonic wave from below the multi-structural body in an upward direction; and a jig 9 which is placed opposite to and above the ultrasonic vibration horn 8 and which is movable up and down. In this Example 1, an ultrasonic heat sealing and cutting device made by NIPPON FUTURE Co., Ltd. with an ultrasonic vibration horn (diameter: 45 mm) attached was used. The jig 9 has a hollow cylindrical shape, and the tip portion of the jig 9 opposite the ultrasonic vibration horn 8 is formed in a blade shape 11 (outside diameter: 40 mm) (blade angle (angle of the portion shown as Numeral 10 in FIG. 6): 120 degrees; and width of the flat tip portion (length of the portion shown as Numeral 11 in FIG. 6): 0.1 mm). This ultrasonic heat sealing and cutting device is designed to hold the sheet-shaped oxygen absorber, which is placed on the ultrasonic vibration horn 8, between the ultrasonic vibration horn 8 and the jig 9, thereby allowing the heat sealing and cutting of the multi-layer structural body.

Figure 2:
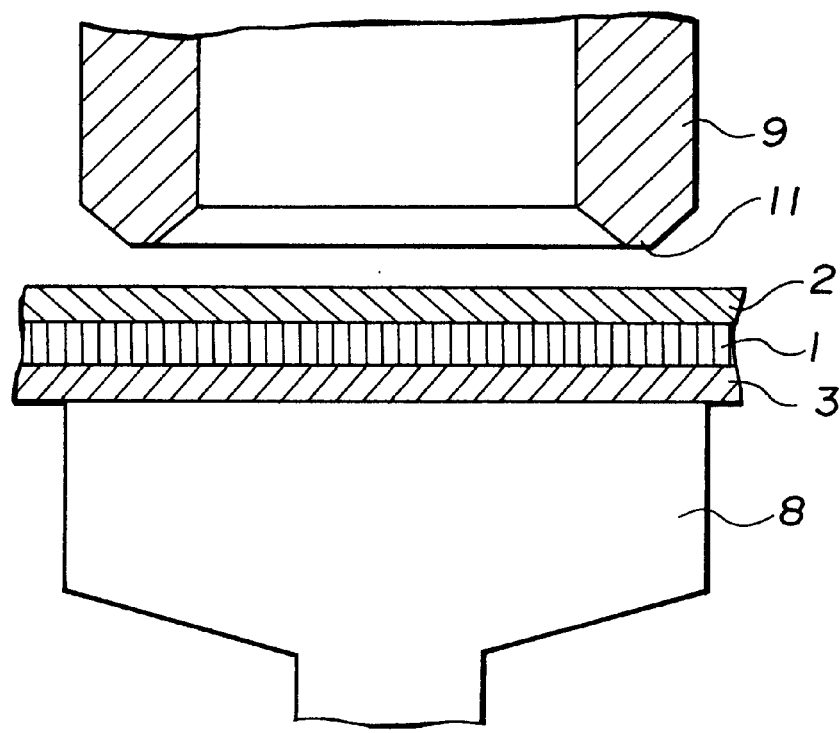
FIG. 2 shows the step of performing the ultrasonic heat sealing and cutting on the multi-layer structural body of the present invention.
Figure 3:
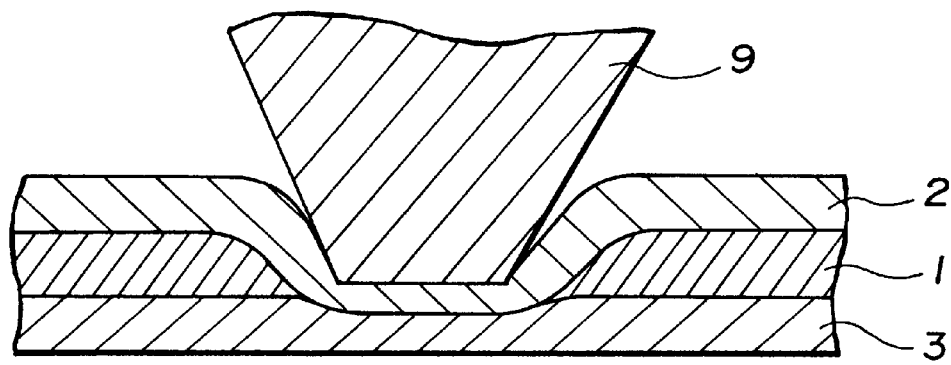
FIG. 3 is a partial sectional view showing the step of performing the ultrasonic heat sealing and cutting on the multi-layer structural body of the present invention.
Figure 4:
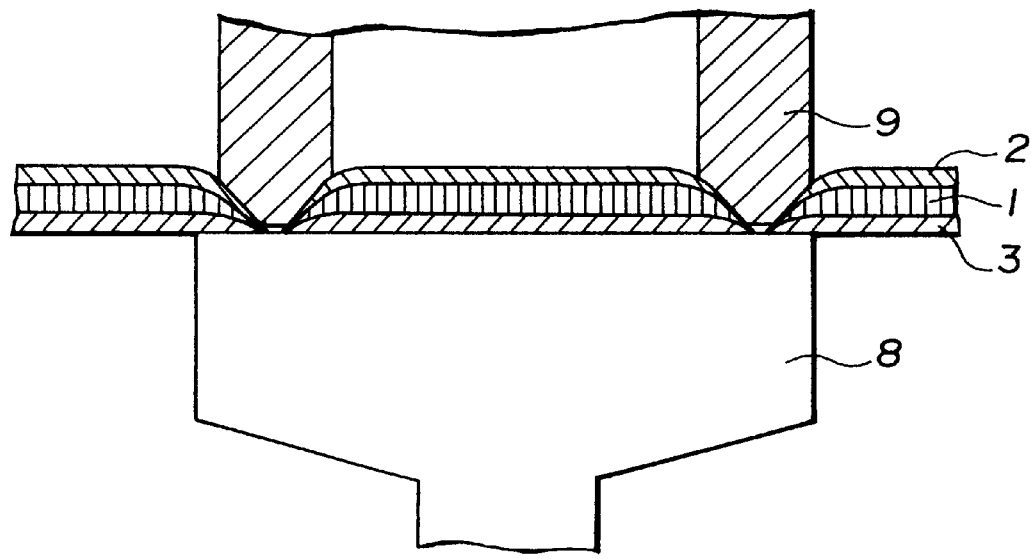
FIG. 4 shows the step of performing the ultrasonic heat sealing and cutting on the multi-layer structural body of the present invention.
Figure 5:
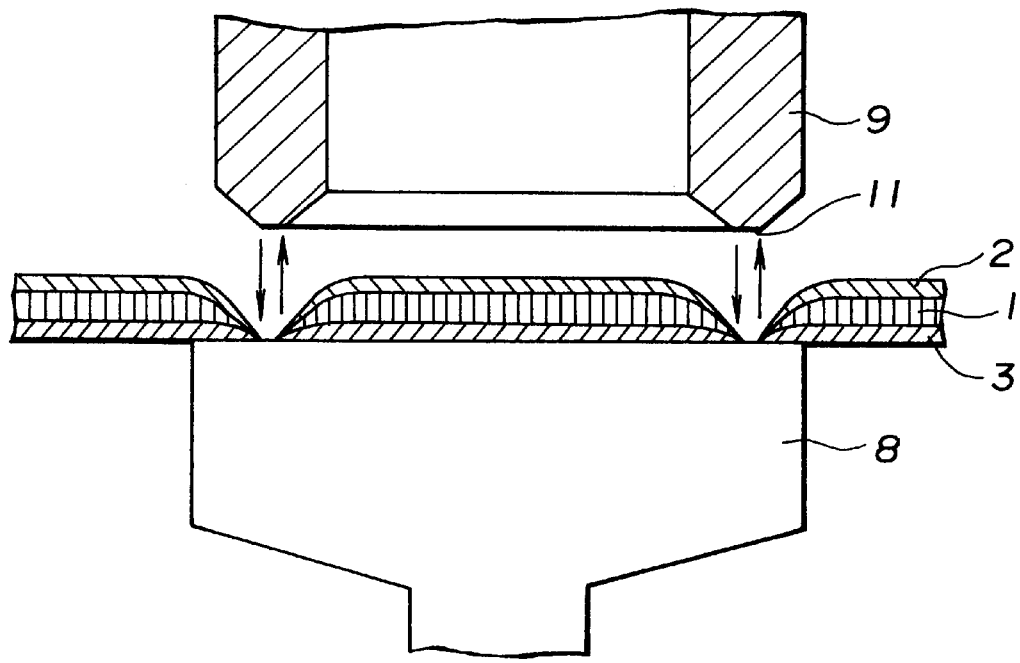
FIG. 5 shows the step of performing the ultrasonic heat sealing and cutting on the multi-layer structural body of the present invention.
Figure 6:
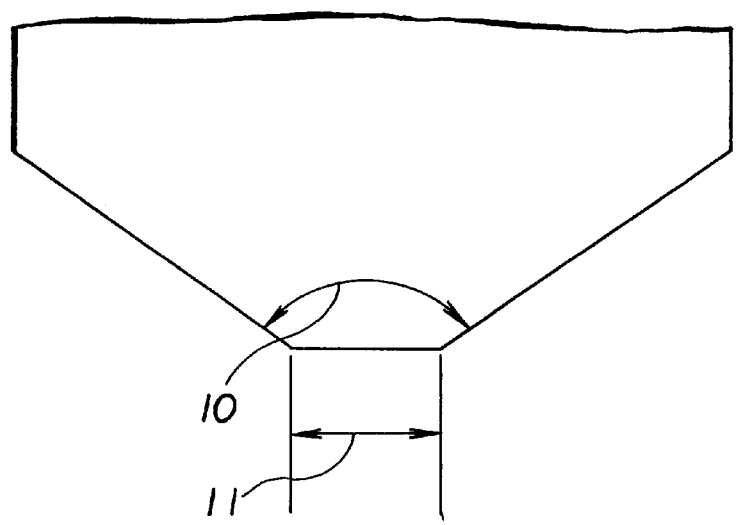
FIG. 6 is a sectional view of the blade portion of the cutting tool used for ultrasonic heat sealing and cutting.

The multi-layer structural body was placed on the ultrasonic vibration horn 8, as shown in FIG. 2. The multi-layer structural body was then held between the ultrasonic vibration horn 8 and the jig 9, as shown in FIG. 3, and simultaneously received an ultrasonic wave from the ultrasonic vibration horn 8. At such time, the ultrasonic vibration horn 8 and the jig 9 were pressed toward each other with the power of 150 Kg for 0.2 seconds. Then, the multi-layer structural body generated heat from inside and the oxygen-absorbing resin sheet 1 softened. At the same time, the portions of the multi-layer structural body facing the blade 11 of the jig 9 which was moving down were held between and pressed by the ultrasonic vibration horn 8 and the blade 11, causing the softened oxygen-absorbing resin sheet 1 to move away from such pressed portions. Moreover, the first heat-sealable resin layer 6 and the second heat-sealable resin layer 5 were pressed and sealed together by heat and, as shown in FIG. 4, were finally pressed and cut by the flat tip portion of the blade 11. Then, as shown in FIG. 5, the jig 9 was moved upward. Consequently, the sheet-shaped oxygen absorber (diameter: 40 mm) was obtained.

When conducting the ultrasonic heat sealing and cutting, either side of the multi-layer structural body, the air-permeable covering member 2 or the air-permeation-resistant covering member 3, may be placed to contact the blade 11.

By utilizing the ultrasonic heat sealing and cutting method, it is possible to cut a plurality of sheet-shaped oxygen absorbers at once. It is also possible to move the multi-layer structural body or the ultrasonic heat sealing and cutting device in a horizontal direction in order to cut the multi-layer structural body successively in a desirable shape. Furthermore, it is possible to combine these methods.

Subsequently, a steamed cake (approximately 50 mmφ) was put on the sheet-shaped oxygen absorber (40 mmφ) thus obtained, both of which were placed together with 150 ml of air in a bag made of triple nylon (made by Ozaki Fine Chemical Corporation). The bag was then hermetically sealed. This hermetically sealed bag containing the sheet-shaped oxygen absorber and the steamed cake was preserved at a temperature of 25° C., and odor within the bag and changes in the surface of the steamed cake contacting with the oxygen absorber were observed. The results are shown in Table 1.

For comparison, the same air-permeable covering member 2, oxygen-absorbing resin sheet 1 and air-permeation-resistant covering member 3 as those used in Example 1 were laid one over another in the order listed above. These layers were laminated by heat by using a heat roller at a temperature of 120° C. The obtained lamination sheet was then punched into a circular shape without heat sealing by using a punch with a Thomson blade (40 mmφ) mounted thereon, thereby producing a sheet-shaped oxygen absorber (Comparative Example 1). The preservation test of the steamed cake was conducted in the same manner as in Example 1 by using the sheet-shaped oxygen absorber (Comparative Example 1). The results are shown in Table 1.

Moreover, for comparison, the same air-permeable covering member 2, oxygen-absorbing resin sheet 1 and air-permeation-resistant covering member 3 as those used in Example 1 were laid one over another in the order listed above. These layers were laminated by heat by using a heat roller at a temperature of 120° C., thereby obtaining a multi-layer structural body. Then, two jigs 9, the same ones as that used in Example 1, were prepared and heated up to a temperature of 200° C. These jigs 9 were made to press the multi-layer structural body from both sides and to cut it by heat sealing, thereby obtaining a sheet-shaped oxygen absorber (40 mmφ) (Comparative Example 2). The preservation test of the steamed cake was conducted in the same manner as in Example 1 by using the sheet-shaped oxygen absorber (Comparative Example 2). The results are shown in Table 1.

TABLE 1

| Items Examined | Days of Passage | | | |
|---|---|---|---|---|
| | After 2 Days | | After 7 Days | |
| | Odor | Surface of the Steamed Cake Contacting with the Oxygen Absorber | Odor | Surface of the Steamed Cake Contacting with the Oxygen Absorber |
| EXAMPLE 1 | Good | Good | Good | Good |
| COMPARATIVE EXAMPLE 1 | Iron powder smell | Rust generated in a ring shape | Iron powder smell | Rust generated in a ring shape |
| COMPARATIVE EXAMPLE 2 | Slight iron powder smell | Rust generated at four positions | Slight iron powder smell | Rust generated in a spotted ring shape |

According to Table 1, it has been proven that in the case of the sheet-shaped oxygen absorber of Example 1, good odor within the bag and good appearance of the steamed cake were maintained after a 7-day preservation. On the contrary, in Comparative Example 1, an iron powder smell and the generation of rust were observed. This is because in Comparative Example 1 the oxygen-absorbing resin sheet was exposed at the periphery of the sheet-shaped oxygen absorber.

Comparative Example 2 was not as bad as Comparative Example 1, but again a slight iron powder smell was generated and also the generation of rust was observed.

As described above, the sheet-shaped oxygen absorber of the present invention is manufactured by being cut by ultrasonic heat sealing and, therefore, the first and second heat-sealable resin layers are fused and sealed together by heat. Accordingly, it is possible to prevent the oxygen-absorbing resin sheet from being exposed at the periphery of the sheet-shaped oxygen absorber. Consequently, the present invention can provide a sheet-shaped oxygen absorber which is superior in safety with no leakage of the oxygen-absorbing composition or contamination of the preserved substance due to contact with the oxygen-absorbing resin sheet.

Moreover, the sheet-shaped oxygen absorber of the present invention can be produced freely in various shapes. For example, it can be used as a mat for food or a cover sheet found inside of a can or box containing food. If the sheet-shaped oxygen absorber is cut in a desirable shape by heat sealing, it is also possible to use it as a part of decorations for food. Therefore, the sheet-shaped oxygen absorber of the present invention not only eliminates a sense of incompatibility that a conventional small-bag-shaped oxygen absorber brings about, but also can be used as a packing material which enhances the product value. Furthermore, the sheet-shaped oxygen absorber of the present invention is superior in its productivity and, therefore, productivity for commercial use can be promoted.

What is claimed is:

1. A method of making a sheet-shaped oxygen absorber comprising:

preparing an oxygen-absorbing resin sheet having opposed first and second surfaces and including an oxygen-absorbing composition in a thermoplastic resin;

applying first and second covering members to and in contact with the first and second surfaces, respectively, of the oxygen-absorbing resin sheet to form a laminated structure, at least one of the covering members being air-permeable; and ultrasonically heat sealing the first covering member to the second covering member by applying ultrasonic energy to the laminated structure and, along the periphery of a closed planar geometric figure smaller in area than the oxygen-absorbing resin sheet and the first and second covering members to encapsulate a part of the oxygen-absorbing resin sheet between the first and second covering members, and cutting the oxygen-absorbing resin sheet and the first and second covering members so that the first and second covering members are sealed to each other along the periphery of the closed planar geometric figure to produce a sheet-shaped oxygen absorber in which the oxygen-absorbing resin sheet is not exposed at edges of the sheet-shaped oxygen absorber.

2. The method according to claim 1 including ultrasonically heat sealing and cutting the laminated structure by placing one side of the laminated structure on an ultrasonic energy generating source, applying pressure to an opposite side of the laminated structure with a jig having a blade with the shape of the closed planar geometric figure, and generating ultrasonic energy to heat the laminated structure.

3. The method according to claim 2 wherein the blade has a generally planar tip having a width in a range from 0.01 to 3 mm.

4. The method according to claim 3 wherein the blade includes oblique surfaces symmetrically extending from edges of the tip and forming an angle in a range of 5° to 175° with a plane perpendicular to the tip and centrally located between the oblique surfaces.

5. The method according to claim 1 wherein each of the first and second covering members comprises a heat sealable resin layer in contact with the oxygen-absorbing resin sheet and an air-permeable member laminated with the respective heat sealable resin layer.

6. The method according to claim 5 wherein the air-permeable member is ethylene-vinyl alcohol copolymer.

7. The method according to claim 1 wherein the first covering member comprises a first heat sealable resin layer in contact with the oxygen-absorbing resin sheet and an air-permeable layer laminated to the first heat sealable resin layer and the second covering member comprises a second heat sealable resin layer in contact with the oxygen-absorbing resin sheet and an air-permeable resistant layer laminated to the second heat sealable resin layer.

8. The method according to claim 7 wherein the air-permeable resistant member comprises laminated films of polyethylene terephthalate and polyethylene.

9. The method according to claim 1 wherein preparing the oxygen-absorbing resin sheet comprises coating iron powder with at least one halide of an alkali element to form an oxygen-absorbing mixture, mixing the oxygen-absorbing mixture with the thermoplastic resin to form an oxygen-absorbing composite, and extruding the oxygen-absorbing composite to produce the oxygen-absorbing resin sheet.

10. The method according to claim 9 wherein the thermoplastic resin is polyethylene.

11. The method according to claim 1 wherein the first and second covering members respectively have thicknesses larger than 0.01 mm and smaller than 5 mm.

12. The method according to claim 1 including simultaneously ultrasonically heat sealing and cutting a plurality of the sheet-shaped oxygen absorbers from the laminated structure of the first and second covering members and the oxygen-absorbing resin sheet.

* * * * *